US012795027B2

(12) United States Patent
Hamada et al.

(10) Patent No.: US 12,795,027 B2
(45) Date of Patent: Nov. 10, 2026

(54) IMAGE READING APPARATUS FOR READING A DOCUMENT MULTIPLE TIMES UNDER DIFFERENT READING CONDITIONS, AND IMAGE FORMING SYSTEM

(71) Applicant: CANON KABUSHIKI KAISHA, Tokyo (JP)

(72) Inventors: Shuhei Hamada, Chiba (JP); Shoki Kikukawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 254 days.

(21) Appl. No.: 18/663,363

(22) Filed: May 14, 2024

(65) Prior Publication Data

US 2024/0397007 A1 Nov. 28, 2024

(30) Foreign Application Priority Data

May 25, 2023 (JP) ................................ 2023-086430

(51) Int. Cl.

*H04N 1/00* (2006.01)
*H04N 1/028* (2006.01)
*H04N 1/60* (2006.01)

(52) U.S. Cl.

CPC ..... *H04N 1/00822* (2013.01); *H04N 1/02895* (2013.01); *H04N 1/6044* (2013.01)

(58) Field of Classification Search

USPC .......................................................... 358/504
See application file for complete search history.

(56) References Cited

U.S. PATENT DOCUMENTS

2001/0040707 A1* 11/2001 Funakoshi ......... H04N 1/40056 358/475
2015/0350493 A1* 12/2015 Sakatani .............. H04N 1/6052 358/504
2021/0218865 A1* 7/2021 Tsuchiya .................. H04N 1/60
2023/0308575 A1* 9/2023 Sato ..................... H04N 1/0285

FOREIGN PATENT DOCUMENTS

JP 2002064719 A 2/2002
JP 2021197692 A 12/2021

* cited by examiner

*Primary Examiner* — Jacky X Zheng
(74) *Attorney, Agent, or Firm* — ROSSI, KIMMS & McDOWELL LLP

(57) ABSTRACT

An image reading apparatus includes: a reading unit comprising a light source, a sensor configured to receive light reflected by a document and output an analog signal, and a converter configured to convert the analog signal into a digital signal, and a controller. The controller is configured to: control the reading unit to perform a plurality of readings of the document; and change a reading condition of the reading unit so that a value of a first digital signal to be acquired in a first reading among the plurality of readings and a value of a second digital signal to be acquired in a second reading among the plurality of readings differ from one another.

15 Claims, 6 Drawing Sheets

FIG. 5A

| | VOLTAGE | SN RATIO |
|---|---|---|
| R | 2.61 | 130.5 |
| G | 0.107 | 5.35 |
| B | 1.19 | 59.5 |
| NOISE | 0.02 | — |

FIG. 5B

| | DIGITAL VALUES | SN RATIO |
|---|---|---|
| R | 810 | 135 |
| G | 33 | 5.5 |
| B | 369 | 61.5 |
| NOISE | 6 | — |

FIG. 5C

| | DIGITAL VALUES | SN RATIO |
|---|---|---|
| R | 1023 | — |
| G | 266 | 44.33 |
| B | 1023 | — |
| NOISE | 6 | — |

FIG. 5D

| | DIGITAL VALUES | SN RATIO |
|---|---|---|
| R | 6480 | 135 |
| G | 266 | 44.33 |
| B | 2952 | 61.5 |

FIG. 6

| NUMBER OF READS | 2 | 1 | | | |
|---|---|---|---|---|---|
| NUMBER OF BITS OF AD CONVERTER | 10 | 10 | 11 | 12 | 13 |
| AVERAGE ΔE | 0.37 | 0.45 | 0.36 | 0.33 | 0.31 |
| MAXIMUM ΔE | 1.35 | 5.31 | 2.63 | 1.48 | 1.23 |

IMAGE READING APPARATUS FOR READING A DOCUMENT MULTIPLE TIMES UNDER DIFFERENT READING CONDITIONS, AND IMAGE FORMING SYSTEM

BACKGROUND OF THE INVENTION

Field of the Invention

The present invention relates to an image reading apparatus, and an image forming system including the image reading apparatus.

Description of the Related Art

There is known an image reading apparatus that optically reads an image on a document by emitting light to the document and receiving reflected light from the document using an image sensor or the like. In a case in which color is measured using an image sensor, red (R), green (G), and blue (B) luminance values (hereinafter "RGB value") output by the image sensor are converted into a color value in a CIELab space (hereinafter "Lab value"). A look-up table (LUT) that is a color conversion table is used to convert an RGB value into a Lab value. In order to suppress the size of the color conversion table, the color conversion table is prepared so as to indicate the relationship between an RGB value and a Lab value for only some RGB values, rather than for all RGB values. Japanese Patent Laid-Open No. 2002-64719 discloses a technique in which an RGB value that is not included in a color conversion table is obtained by performing an interpolation calculation based on relationships between RGB values and Lab values included in the color conversion table.

In a case in which RGB values output by an image sensor are converted into Lab values by performing an interpolation calculation based on information indicated by a color conversion table, the color measurement accuracy is dependent on the size of the color conversion table, i.e., the number of correspondence relationships between RGB values and Lab values indicated by the color conversion table. However, for colors in the low-brightness color area, the image sensor reads different colors as having the same RGB value, and thus color measurement accuracy cannot be increased even if the size of the color conversion table is increased.

SUMMARY OF THE INVENTION

According to an aspect of the present disclosure, an image reading apparatus that reads a document includes: a reading unit comprising a light source configured to emit light to the document; a sensor configured to receive the light reflected by the document and output an analog signal based on a light reception result of the reflected light; and a converter configured to convert the analog signal output by the sensor into a digital signal, and output the digital signal obtained as a result of the conversion by the converter, and a controller. The controller is configured to: control the reading unit to perform a plurality of readings of the document; and change a reading condition of the reading unit so that a value of a first digital signal to be acquired in a first reading among the plurality of readings and a value of a second digital signal to be acquired in a second reading among the plurality of readings differ from one another.

Further features of the present invention will become apparent from the following description of exemplary embodiments with reference to the attached drawings.

BRIEF DESCRIPTION OF THE DRAWINGS

FIGS. 5A to 5D are diagrams for describing synthesis processing according to some embodiments.

FIG. 6 is a diagram illustrating comparative examples of color difference.

DESCRIPTION OF THE EMBODIMENTS

Figure 1:
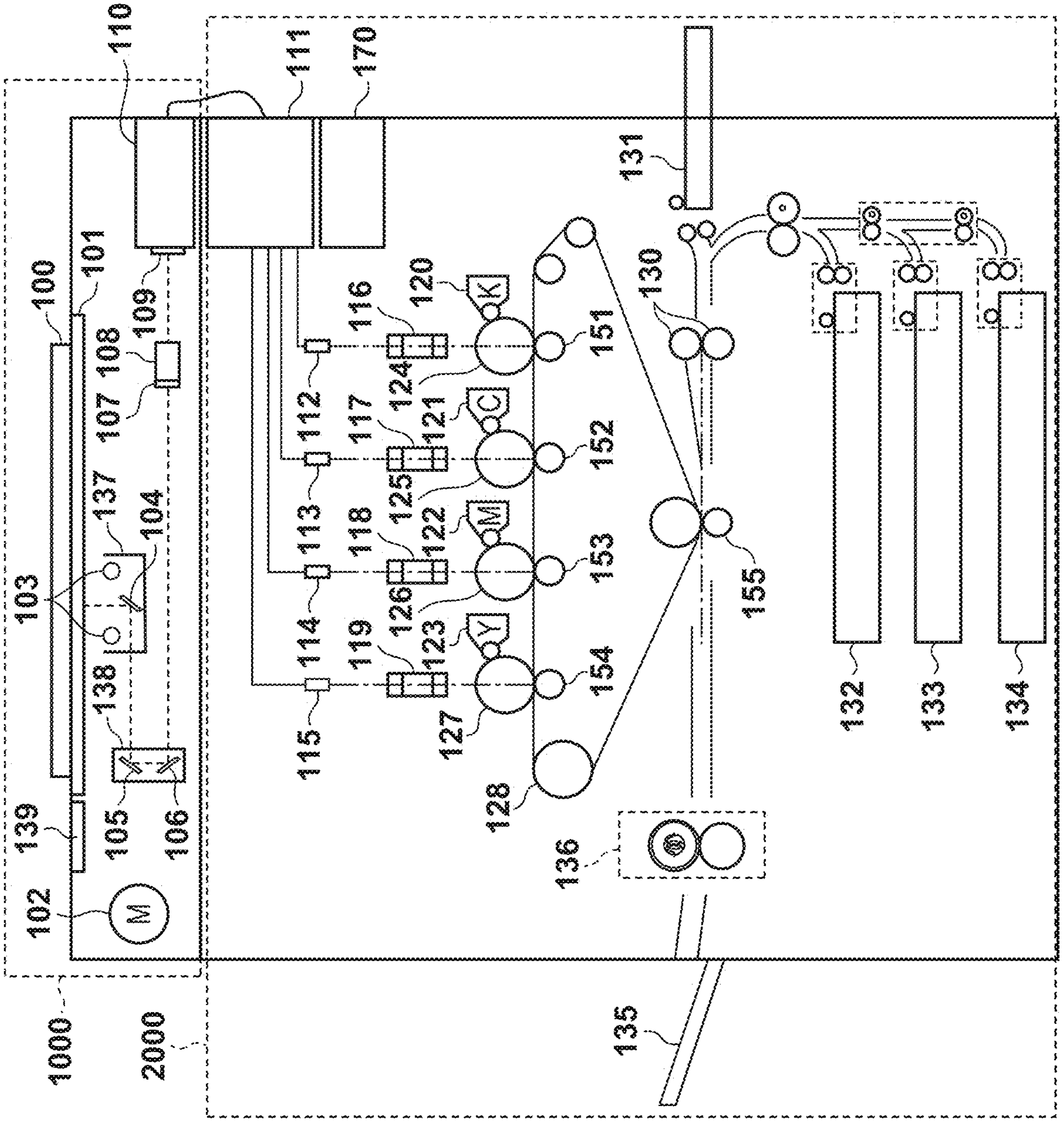
FIG. 1 is a configuration diagram of an image forming system according to some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a configuration diagram of an image forming system according to the present embodiment. The image forming system includes an image reading apparatus 1000 and an image forming apparatus 2000. First, the image reading apparatus 1000 will be described. A document 100, which is an object whose color is to be measured, is placed on a glass document table 101. An image sensor 109 includes a plurality of light-receiving elements that are arranged along the depth direction in the drawing. The depth direction in the drawing is also referred to as a main scanning direction. For example, the light-receiving elements are CMOS sensors or CCD sensors. White LEDs 103 that are light sources emit light to the document 100. The light reflected by the document 100 is reflected by mirrors 104, 105, and 106, and enters the image sensor 109 through an infrared (IR)-cut filter 107 and a lens 108. Thus, by performing scanning once, the image sensor 109 outputs, to an image processing unit 110, an image signal that is a result of reading one line across the document 100 in the main scanning direction.

The image signal output by the image sensor 109 is collectively refers to a first image signal that is an analog signal and indicates a luminance value (pixel value) of the color red, a second image signal that is an analog signal and indicates a luminance value (pixel value) of the color green, and a third image signal that is an analog signal and indicates a luminance value (pixel value) of the color blue. The first image signal is output from a light-receiving element that receives light from the document 100 through a red filter provided in the image sensor 109. The second image signal is output from a light-receiving element that receives light from the document 100 through a green filter provided in the image sensor 109. The third image signal is output from a light-receiving element that receives light from the document 100 through a blue filter provided in the image sensor 109. In such a manner, the image sensor 109 according to the present embodiment is a three-channel sensor. The white LEDs 103, the mirrors 104, 105, and 106, the IR-cut filter 107 and the lens 108, the image sensor 109, and an A/D converter 202 (see FIG. 2) of the image processing unit 110 form a reading unit. Furthermore, the mirrors 104, 105, and 106, the IR-cut filter 107, and the lens 108 are optical members that form an image of the light reflected by the document 100 on the image sensor 109.

A motor 102 moves, in the left-right direction in the drawing, a first mirror unit 137 including the white LEDs 103 and the mirror 104, and a second mirror unit 138 including the mirrors 105 and 106. The left-right direction in the drawing is also referred to as a sub scanning direction. By repeatedly performing scanning of the document 100 by the reading unit while moving the first mirror unit 137 and the second mirror unit 138 in the sub scanning direction, the image sensor 109 outputs, to the image processing unit 110, an image signal that is a result of reading the entire document 100. The image signal that is the result of reading the entire document 100 indicates, for each pixel of the document 100, a red pixel value (luminance value), a green pixel value (luminance value), and a blue pixel value (luminance value). The image processing unit 110 processes the image signal from the image sensor 109 to generate a read image signal, and outputs the generated read image signal to an image processing unit 111 of the image forming apparatus 2000. The read image signal also indicates a red pixel value (luminance value), a green pixel value (luminance value), and a blue pixel value (luminance value). The processing performed by the image processing unit 110 includes analog-to-digital conversion processing for converting the red, green, and blue analog pixel values indicated by the image signal into digital pixel values (digital values). A white reference plate 139 is a reference member that is used for calibration of the white LEDs 103 and the image sensor 109.

Next, a configuration of the image forming apparatus 2000 will be described. During image forming, photoreceptors 124 to 127 are each charged to a predetermined potential by an unillustrated charger and driven to rotate in the counterclockwise direction in the drawing. Semiconductor lasers 112 to 115 each emit laser light based on an output signal from the image processing unit 111. Polygon mirrors 116 to 119 scan the photoreceptors 124 to 127 with laser light emitted from the semiconductor lasers 112 to 115. Thus, electrostatic latent images are formed on the photoreceptors 124 to 127. Developer units 120 to 123 respectively include black (K) toner, cyan (C) toner, magenta (M) toner, and yellow (Y) toner. The developer units 120 to 123 form toner images on the photoreceptors 124 to 127 by developing the electrostatic latent images on the photoreceptors 124 to 127 using the toner. Primary transfer rollers 151 to 154 transfer the toner images on the photoreceptors 124 to 127 onto an intermediate transfer belt 128. By transferring the toner images on the photoreceptors 124 to 127 onto the intermediate transfer belt 128 so as to be overlaid on one another, colors other than black, cyan, magenta, and yellow can be reproduced. During image forming, the intermediate transfer belt 128 is driven to rotate in the clockwise direction in the drawing. Thus, the toner images on the intermediate transfer belt 128 are conveyed to a position facing a secondary transfer roller 155.

Meanwhile, a sheet fed onto a conveyance path from a cassette 132, a cassette 133, a cassette 134, or a manual feed tray 131 is conveyed to the position facing the secondary transfer roller 155 by rollers 130. The secondary transfer roller 155 transfers the toner images on the intermediate transfer belt 128 onto the sheet. A fixing device 136 fixes the toner images onto the sheet by applying heat and pressure to the sheet. After the toner images have been fixed, the sheet is discharged onto a discharge tray 135. A control unit 170 controls the entire image forming system.

Figure 2:
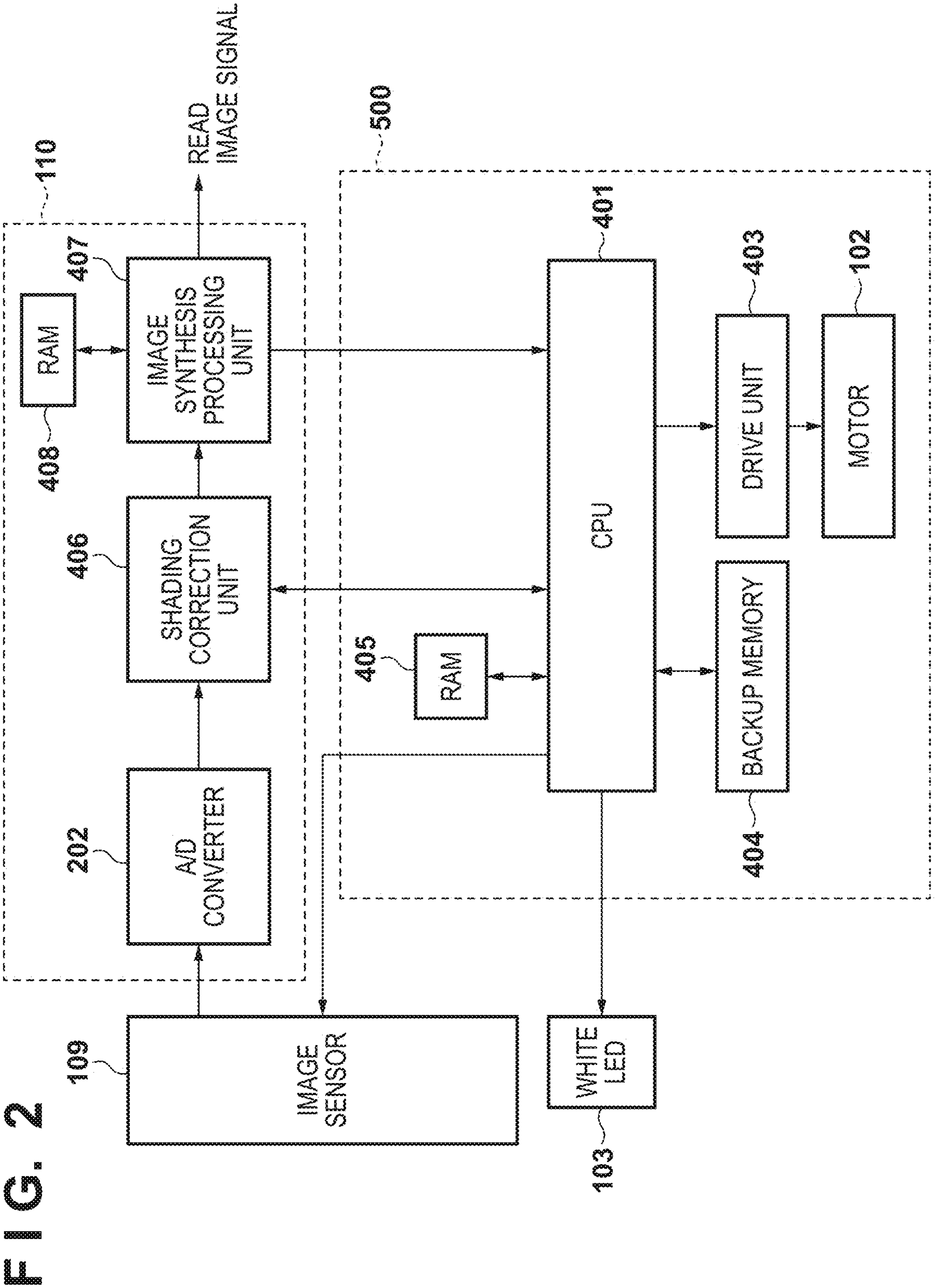
FIG. 2 is a control configuration diagram of an image reading apparatus according to some embodiments.

FIG. 2 illustrates a control configuration of the image reading apparatus 1000. A CPU 401 of a control unit 500 controls the operation of the image reading apparatus 1000. Light emission by the white LEDs 103 is controlled by the CPU 401. A drive unit 403 controls the drive of the motor 102 based on an instruction from the CPU 401. The motor 102 moves the first mirror unit 137 and the second mirror unit 138 in the sub scanning direction. The CPU 401 sets an accumulation time (light-receiving duration) and sensitivity (gain) of the light-receiving elements of the image sensor 109. Note that, if the accumulation time of the light-receiving elements is increased with the movement speed of the first mirror unit 137 kept the same, reading resolution decreases. Thus, in order to keep the reading resolution at the same level, the movement speed of the first mirror unit 137 and the second mirror unit 138 is changed in accordance with the accumulation time.

Levels (signal values), such as voltage values, of analog image signals output by the image sensor 109 correspond to the red, green, and blue luminance values of each pixel of the document 100, and change depending on a set value of the light-emission luminance (light-emission intensity) of the white LEDs 103, and set values of the accumulation time and sensitivity of the light-receiving elements of the image sensor 109. The CPU 401 determines a reading condition, i.e., the set value of the light-emission luminance of the white LEDs 103 and the set values of the accumulation time and the sensitivity of the light-receiving elements of the image sensor 109, based on levels of analog image signals output by the image sensor 109 when the white reference plate 139 is read.

Figure 3:
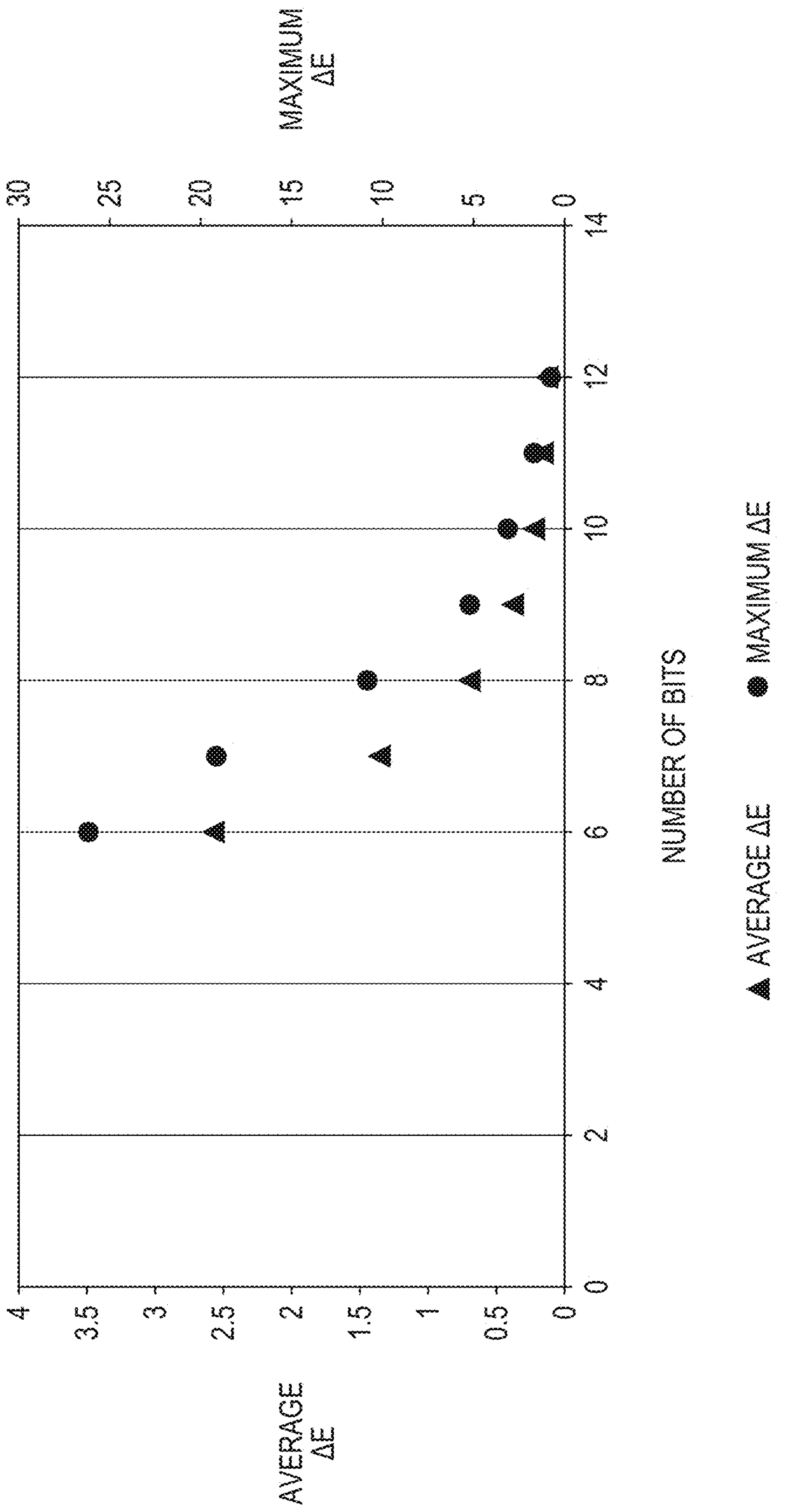
FIG. 3 is a diagram illustrating a relationship between color measurement accuracy and the number of bits of an A/D converter.

Analog image signals output by the image sensor 109 are converted into digital image signals by the A/D converter 202. In other words, the A/D converter 202 converts the levels of the analog image signals into digital values. For each pixel of the document 100, the analog image signals and the digital image signals indicate red, green, and blue luminance values. Note that luminance values are indicated by the levels of the analog image signals. That is, the luminance values indicated by the analog image signals are analog values. On the other hand, the luminance values indicated by the digital image signals are digital values. In the following description, a combination of the three luminance values of the colors red, green, and blue is also referred to as a color value. Furthermore, the analog image signals and the digital image signals are collectively referred to as image signals. FIG. 3 is a diagram illustrating a relationship between color measurement accuracy and the number of bits of the A/D converter 202. The horizontal axis indicates the number of bits of the A/D converter 202. "ΔE" shown on the vertical axis is obtained by quantifying the difference between two points in the L*a*b* space in accordance with the characteristics of the human eye, and the smaller the ΔE, the higher the color measurement accuracy. As is obvious from FIG. 3, the more the number of bits of the A/D converter 202, the higher the color measurement accuracy. This is because the more the number of bits, the less the quantization error. The effect of the quantization error is especially great in the low-brightness color area. Specifically, in the low-brightness color area, a situation in which the same color value is output for two different colors occurs more frequently than in other color areas, and this results in a degradation of color measurement accuracy. Note that the more the number of bits of the A/D converter 202, the higher the cost. Thus, the number of bits of the A/D converter 202 is determined with the balance between cost and color measurement accuracy in mind.

Returning to FIG. 2, a shading correction unit 406 executes shading correction on the luminance value of each color indicated by a digital image signal output by the A/D converter 202. The shading correction is processing for suppressing a non-uniformity in white-LED light amount and differences in the sensitivities of the light-receiving elements of the image sensor 109. Specifically, a shading coefficient is obtained by comparing a target value and a value (output value) indicated by an image signal obtained when the white reference plate 139 is read. The CPU 401 executes the shading correction based on this shading coefficient. A backup memory 404 is a non-volatile memory, and stores various types of data necessary for the shading correction. A RAM 405 is used for temporary storage of data during the shading correction.

In the present embodiment, one document 100 is read repeatedly multiple times under different reading conditions. The image processing unit 110 generates one read image signal based on a plurality of image signals obtained as a result of multiple iterations of reading. An image synthesis processing unit 407 performs synthesis processing on the plurality of image signals obtained as a result of multiple iterations of reading the document 100. A RAM 408 is used to temporarily store image signals in the synthesis of image signals. The synthesis processing will be described in detail later. The number of times reading is performed can be set to twice or more times. In the following, reading processing in a case in which the number of times reading is performed is twice will be described.

Figure 4:
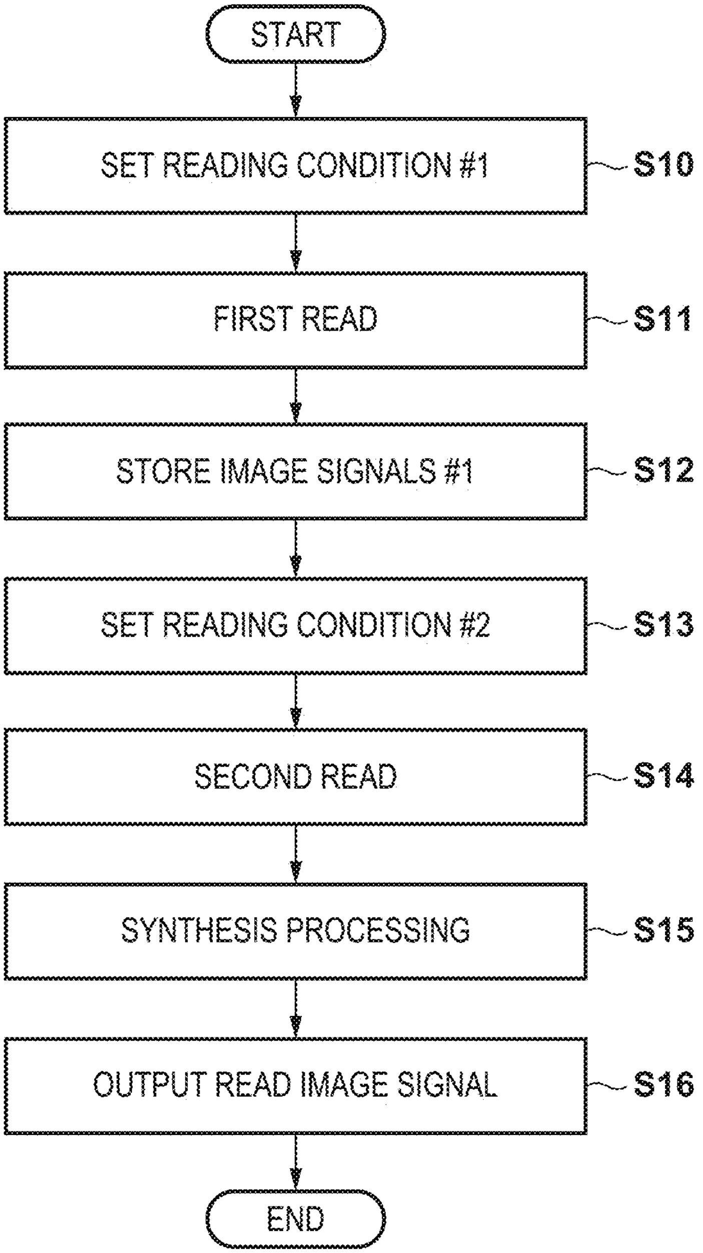
FIG. 4 illustrates a flowchart of processing performed by the image reading apparatus according to some embodiments.

FIG. 4 is a flowchart of processing executed by the image reading apparatus 1000. In step S10, the CPU 401 sets reading condition #1 for the first iteration. Reading condition #1 is a reading condition set in advance so that the levels (signal values) of analog image signals are not saturated. Reading condition #1 can be determined based on levels (corresponding to luminance values) of analog image signals obtained when the white reference plate 139 is read, or digital values (luminance values) indicated by digital image signals obtained when the white reference plate 139 is read. Note that, when an analog image signal is saturated, a light-receiving element of the image sensor 109 is saturated and the level of an analog image signal from the light-receiving element has the maximum value. For example, light-receiving elements may be saturated when the set value of the light-emission luminance of the white LEDs 103 and the set values of the accumulation time and the sensitivity of the light-receiving elements of the image sensor 109 are excessively high. Note that, in the present embodiment, the maximum analog image signal level that can be input to the A/D converter 202 is higher than or equal to the maximum analog image signal level output by the image sensor 109. The CPU 401 reads a document 100 under reading condition #1 in step S11, and stores digital image signals #1 read under reading condition #1 to the RAM 408 in step S12. The image reading apparatus 1000 can acquire a color value of each pixel of the document 100 based on reading condition #1. Note that the levels of analog image signals #1 that the image sensor 109 outputs by reading the document 100 under reading condition #1 are not saturated.

In step S13, the CPU 401 sets reading condition #2 for the second iteration. Reading condition #2 is a condition that increases the levels of analog image signals output by the image sensor 109 so as to be higher than the levels thereof under reading condition #1, and is one of the following.

1. Increasing the light-emission luminance of the white LEDs 103 compared to that in the first iteration.
2. Increasing the accumulation time of the light-receiving elements of the image sensor 109 compared to that in the first iteration.
3. Increasing the sensitivity of the light-receiving elements of the image sensor 109 compared to that in the first iteration.
4. A combination of 1 to 3.

Note that reading condition #2 may be a predetermined condition.

Furthermore, the reading conditions may be configured such that a conversion characteristic that the A/D converter 202 uses to convert analog signals into digital signals is switched to a different conversion characteristic. For example, a conversion characteristic in which the sensitivity (resolution) for low luminance is higher than the sensitivity (resolution) for high luminance is used in reading condition #1 for the first iteration, and a conversion characteristic in which the sensitivity (resolution) for high luminance is higher than the sensitivity (resolution) for low luminance is used in reading condition #2 for the second iteration.

In step S14, the CPU 401 reads the document 100 under reading condition #2 and acquires digital image signals #2. Reading condition #2 is a condition that increases the levels of analog image signals output by the image sensor 109 so as to be higher than the levels thereof under reading condition #1. Thus, under reading condition #2, the level of an analog image signal indicating a luminance value of a color in an area of the document 100 where brightness is not low may be saturated. However, the quantization error in the A/D converter 202, etc., decrease for a color in an area where brightness is low. Thus, the signal-to-noise ratio is improved and color separation performance improves for a color in an area where brightness is low. Note that, in the second iteration of reading, the same shading coefficient as that in the first iteration of reading is used. In step S15, the image synthesis processing unit 407 performs synthesis processing for generating a read image signal based on image signal #1 and image signal #2. In step S16, the image synthesis processing unit 407 outputs the read image signal to the image forming apparatus 2000 as a result of reading the document 100.

Next, the synthesis processing in step S15 in FIG. 4 will be described. FIG. 5A to FIG. 5D are diagrams for describing the synthesis processing. In the following, it is supposed that, as illustrated in FIG. 5A, the image sensor 109 has outputted, in the first iteration of reading, analog image signals #1 indicating red, green, and blue levels of (R, G, B)=(2.61 V, 0.107 V, 1.19 V) as a color value of a given pixel. Note that, as illustrated in FIG. 5A, the maximum voltage of noise in the analog image signals #1 is 0.02 V. Furthermore, the A/D converter 202 has 10 bits, and the maximum input voltage (level) is 3.3 V. Thus, for an input voltage of 3.3 V, the A/D converter 202 outputs 1023 as a digital value. Furthermore, the maximum analog image signal level is also 3.3 V. Thus, if the level of an analog image signal is saturated, the A/D converter 202 outputs 1023 as a digital value. Note that the signal-to-noise ratios in the tables in FIG. 5A to FIG. 5D each indicates a value obtained by dividing a signal level by the noise level. FIG. 5B indicates digital values (luminance values) of digital image signals #1 output by the A/D converter 202 when analog image signals #1 in FIG. 5A are input thereto. The digital values (luminance values) are (R, G, B)=(810, 33, 369), and the signal-to-noise ratios are (135, 5.5, 61.5). If the synthesis processing is not performed, the values indicated in FIG. 5B are output to the image forming apparatus 2000 as a read image signal.

For example, suppose that, as reading condition #2, a condition in which the accumulation time of the light-receiving elements is increased to twice that in reading condition #1, and the sensitivity of the light-receiving elements is increased to four times that in the reading condition #1 is set. That is, reading condition #2 is set so that levels that are eight times those of analog image signal #1 under reading condition #1 are output. FIG. 5C indicates digital values of digital image signals #2 output by the A/D converter 202 in this case. As illustrated in FIG. 5C, the R digital value and the B digital value are 1023, which indicates that the levels of corresponding analog image signals #2 are saturated. On the other hand, the level of the analog image signal indicating the G luminance value equals 0.107 V×8=0.856 V, and thus the G digital value is 266, which indicates that the level of corresponding analog image signal #2 is not saturated. Note that, because the noise voltage does not change, the noise digital value is 6. Thus, the signal-to-noise ratio for G improves to approximately 44.33 from 5.5 in the first iteration.

In the second iteration of reading, the levels of analog image signals #2 from the image sensor 109 are eight times those in the first iteration. Thus, the level of analog image signal #2 indicating a luminance value of a color of the pixel for which the digital value in the first iteration of reading was higher than or equal to 128 is saturated. On the other hand, the level of analog image signal #2 indicating a luminance value of a color of the pixel for which the digital value in the first iteration of reading was equal to or lower than 127 is not saturated, and the reading accuracy of the luminance value improves as a result of the increase in level. The image synthesis processing unit 407 generates a read image signal by using the digital value in the first iteration for a color for which the digital value in the result of the first iteration of reading was higher than or equal to 128 and using the digital value in the second iteration for a color for which the digital value in the result of the first iteration of reading was equal to or lower than 127. Note that digital values corresponding to the first iteration are multiplied by eight to balance the levels thereof with those of digital values corresponding to the second iteration. Thus, the digital values of the read image signal are (R, G, B)=(6480, 266, 2952) as illustrated in FIG. 5D, and the signal-to-noise ratios are (135, 44.33, 61.5). Note that the read image signal is 13-bit data.

FIG. 6 is a table showing a comparison between the color measurement accuracy in a case in which an A/D converter 202 having 10 bits was used and the synthesis processing was performed, and the color measurement accuracy in cases in which A/D converters 202 having 10 to 13 bits were used and the synthesis processing was not performed. As the chart for evaluating color measurement accuracy, ISO-12642-2 (1617 colors) specified by Japan Color was used. According to FIG. 6, it can be seen that, when the number of bits of the A/D converter 202 is the same at 10 bits, reading accuracy is improved by performing the synthesis processing. This is because, as described above, the document 100 was read under a reading condition that increases analog image signal levels of colors with low brightness. Furthermore, even with an A/D converter 202 having 10 bits, by performing the synthesis processing, the maximum ΔE is improved compared to a case in which an A/D converter 202 having 12 bits is used without performing the synthesis processing, and the average ΔE is improved compared to a case in which an A/D converter 202 having 11 bits is used. In such a manner, color measurement accuracy can be improved by performing synthesis processing of a plurality of image signals read under different reading conditions. Note that, while the number of bits of the A/D converter 202 is 10 in the present embodiment, the number of bits of the A/D converter 202 is not limited to 10 bits.

Note that, in a case in which the number of times reading is performed is twice or more times, a reading condition to be used in the first iteration of reading and reading conditions to be respectively used in the second and subsequent iterations of reading are set. The reading conditions to be used in the second and subsequent iterations of reading differ from one another. The image processing unit 110 determines a luminance value higher than or equal to a first luminance value in the read image signal based on a digital value obtained from the level of analog image signal #1 obtained in the first iteration of reading. On the other hand, the image processing unit 110 determines a luminance value lower than the first luminance value in the read image signal based on a digital value obtained from the levels of analog image signals #2 obtained in the second and subsequent iterations of reading. The first luminance value can be determined based on the reading conditions.

For example, suppose that the number of times reading is performed is three times, and reading conditions for the second and third iterations are respectively set so that the levels of analog image signals are 4 times and 16 times those with the first reading condition. Furthermore, in the following description, "luminance values" of the read image signal are indicated based on luminance values obtained in the first iteration of reading. In this case, a color of the pixel for which the luminance value was higher than or equal to 256 in the first iteration of reading cannot be read in the second iteration of reading because the level of the analog image signal is saturated. Furthermore, a color of the pixel for which the luminance value was higher than or equal to 64 in the first iteration of reading cannot be read in the third iteration of reading because the level of the analog image signal is saturated. That is, a color of the pixel for which the luminance value is higher than or equal to 256 in the first iteration of reading can only be read in the first iteration of reading. Thus, in this case, the first luminance value is set to 256. That is, the image processing unit 110 determines a luminance value higher than or equal to 256 in the read image signal based on a digital value obtained from the level of an analog image signal obtained in the first iteration of reading. On the other hand, the image processing unit 110 determines a luminance value lower than 256 in the read image signal based on a digital value obtained from the levels of analog image signals obtained in the second and subsequent iterations of reading.

Note that the range of luminance values that can be read in the second iteration of reading is 0-255 based on the luminance values in the first iteration of reading. Furthermore, the range of luminance values that can be read in the third iteration of reading is 0-63 based on the luminance values in the first iteration of reading. That is, a color of the pixel for which the luminance value in the first iteration of reading is within the range of 64-255 cannot be read in the third iteration of reading because the level of the analog image signal is saturated. Thus, the image processing unit 110 determines a luminance value within the range of 64-255 in the read image signal based on a digital value obtained from the level of the analog image signal obtained in the second iteration of reading. On the other hand, in regard to a color of the pixel for which the luminance value in the first iteration of reading is within the range of 0-63, the analog image signal level is not saturated neither in the second iteration nor the third iteration. In this case, for a color of the pixel for which the luminance value in the first iteration of reading is within the range of 0-63, the image processing unit 110 performs the determination based on the maximum value among the levels of the analog image signals in the second and third iterations, or specifically, the level of the analog image signal in the third iteration.

Note that, in the present embodiment, reading condition #1 in the first iteration of reading was set so that levels of analog image signals are not saturated when the document 100 is read. However, the iteration among the multiple iterations of reading to which reading condition #1 is to be applied can be determined as appropriate, and the present embodiment is not limited to the case in which reading condition #1 is applied to the first iteration of reading.

More generally, suppose that the image reading apparatus 1000 performs N iterations (where N is an integer or 2 or more) of reading. Reading conditions #1 to #N for the 1st to Nth iterations differ from one another. That is, analog image signals that the image sensor 109 outputs upon reading the document 100 under reading conditions #1 to #N have different levels. Note that one of the N reading conditions is set so that the levels of analog image signals that the image sensor 109 outputs upon reading the document 100 are not saturated. In the following, it is supposed that reading condition #1 is the condition under which none of the levels output from the image sensor 109 are saturated when the document 100 is read.

Based on reading conditions #1 to #N, the image synthesis processing unit 407 groups luminance values of digital image signals #1 acquired under reading condition #1 into ranges #1 to #N. Here, luminance values within range #n (where n is an integer of 1 to N) are continuous and associated with reading condition #n. Note that range #n associated with reading condition #n includes only luminance values with which image signals are not saturated even if the document 100 is read under reading condition #n. For example, in the above-described example in which reading is performed three times, range #1, range #2, and range #3 associated with reading condition #1, reading condition #2, and reading condition #3 for the first iteration, the second iteration, and the third iteration are a range of luminance values of 256 to 1023, a range of luminance values of 64 to 256, and a range of luminance values of 0-63, respectively. If the luminance value of one color of one pixel indicated by digital image signal #1 acquired under reading condition #1 is included in range #n, the image synthesis processing unit 407 uses, as the luminance value of the color of the pixel indicated by the read image signal, the luminance value of the color of the pixel indicated by digital image signal #n acquired under reading condition #n. The image synthesis processing unit 407 generates the read image signal in such a manner. Note that, upon generating the read image signal, the image synthesis processing unit 407 equalizes the resolutions (the number of bits indicating digital values) of digital image signals #1 to digital image signals #N.

According to the synthesis processing described in the present embodiment, color information of the document 100 can be read accurately because the color separation performance of the image reading apparatus 1000 improves. Because color information of the document 100 can be accurately obtained from a read image signal output by the image reading apparatus 1000, the resemblance of the color tone of printed object output by the image forming apparatus 2000 with that of the document 100 can be increased.

The more accurately the image reading apparatus 1000 can read color information of the document 100, the higher the resemblance of the color tone of printed object output by the image forming apparatus 2000 with that of the document 100. For example, in a case in which there is image data (document data) of a color sample (reference printed object), the resemblance of the color tone of printed object output by the image forming apparatus 2000 with that of the reference printed object can be increased with higher accuracy by using a system technique called color sample matching. Specifically, first, the image forming apparatus 2000 is caused to form an image on a sheet based on the document data, and test printed object is thereby output. Both this test printed object and the reference printed object, which is a color sample, are read using the image reading apparatus 1000, and print data to be used to produce printed object corresponding to the reference printed object using the image forming apparatus 2000 is created based on the difference between two read image signals, and printed object is output based on the print data. According to this configuration, the resemblance of the color tone of the printed object with that of the reference printed object can be increased.

In such a manner, the image forming system according to the present embodiment can be used as a color sample matching system. Note that the image processing of creating print data to be used in printing by the image forming apparatus 2000 based on the difference between two read image signals may be performed by the control unit 170 or the image processing unit 111 of the image forming apparatus 2000, for example. Furthermore, the image processing may be performed by the image processing unit 110 of the image reading apparatus 1000. Furthermore, the image processing may be performed by an image processing apparatus that is communicably connected to the image forming apparatus 2000 and the image reading apparatus 1000. In this case, the image forming system may include the image forming apparatus 2000, the image reading apparatus 1000, and the image processing apparatus.

Furthermore, the image forming system including the image reading apparatus 1000 according to the present embodiment is applicable to color adjustment technology. The color tone of printed object printed by the image forming apparatus 2000 is prone to change due to individual differences, and temporal and environmental changes. Color adjustment technology is technology for suppressing such change in color tone. Before using the image forming apparatus 2000 to output printed object, the image forming apparatus 2000 is caused to output a sheet on which a color adjustment chart is formed by causing the image forming apparatus 2000 to form an image based on image data of the color adjustment chart. By reading this sheet on which the color adjustment chart has been formed using the image reading apparatus 1000, the image reading apparatus 1000 outputs a read image signal (read data) that is a result of reading the color adjustment chart. Based on the read data, a printer profile of the image forming apparatus 2000 until image data is output as printed object can be ascertained.

Then, by adjusting image forming conditions of the image forming apparatus 2000 based on the ascertained printer profile, or by converting, based on the ascertained printer profile, image data that the image reading apparatus 1000 outputs to the image forming apparatus 2000, the resemblance of the color tone of printed object with that of a document 100 can be increased.

Note that the adjustment of image forming conditions of the image forming apparatus 2000 based on read data can be performed by the image forming apparatus 2000. Furthermore, the conversion, based on read data, of image data to be output to the image forming apparatus 2000 can be performed by the image reading apparatus 1000.

Second Embodiment

Next, a second embodiment will be described focusing on differences from the first embodiment. In the present embodiment, the necessity of the second and subsequent iterations of reading is determined based on the result of the first iteration of reading, and the second and subsequent iterations of reading and the synthesis processing are performed if it is determined that the second and subsequent iterations of reading are necessary. On the other hand, the result of the first iteration of reading is output as a read image signal if it is determined that the second and subsequent iterations of reading are unnecessary.

Figure 7:
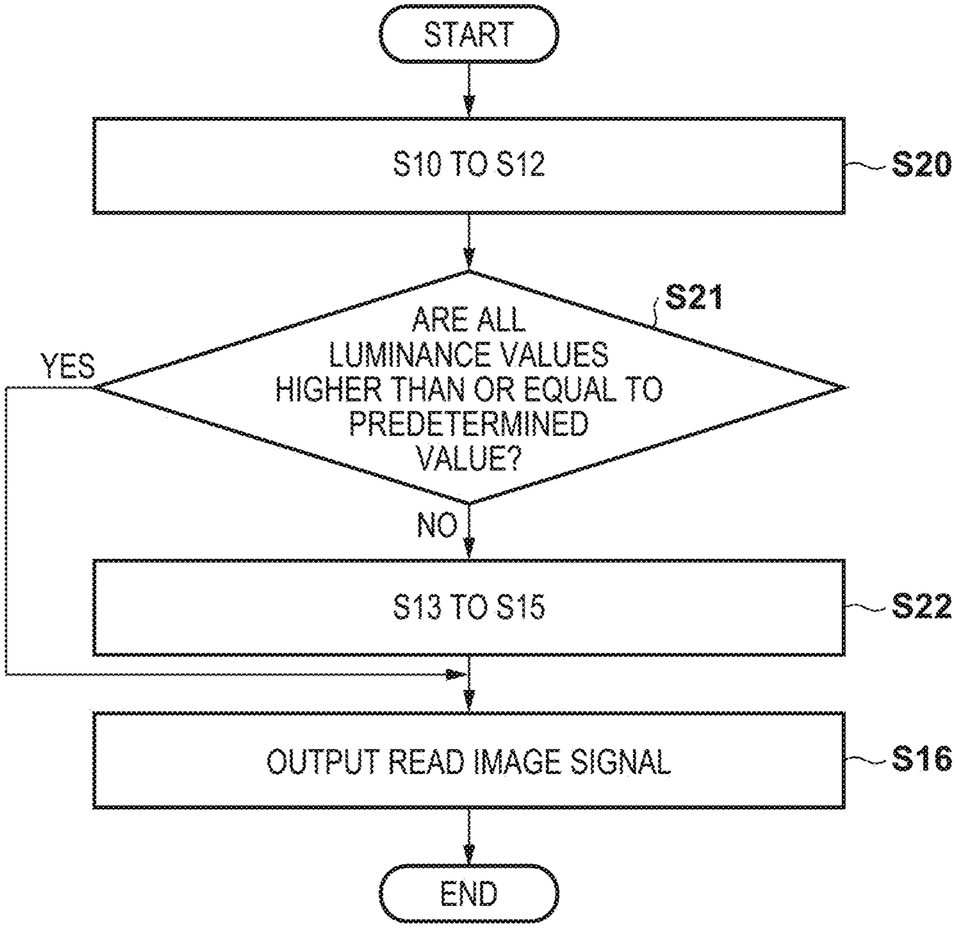
FIG. 7 illustrates a flowchart of processing performed by the image reading apparatus according to some embodiments.

FIG. 7 is a flowchart according to the present embodiment. In step S20, the CPU 401 executes the processing in steps S10 to S12 in FIG. 4. Thus, image signal #1 read under reading condition #1 is stored in the RAM 408. In step S21, it is determined whether all luminance values (digital values) indicated by the result of the first iteration of reading are higher than or equal to a predetermined value. The predetermined value is determined based on the reading condition for the first iteration and reading conditions to be used for the second and subsequent iterations of reading. For example, in a case in which reading condition #2 that increases output to eight times that with reading condition #1 is to be used for the second iteration as described in the first embodiment, the predetermined value is 128. This is because all luminance values would be saturated even if reading is performed under reading condition #2. If all luminance values indicated by the result of the first iteration of reading is higher than or equal to the predetermined value, the CPU 401 causes the image synthesis processing unit 407 to output the result of the first iteration of reading as a read image signal in step S16. On the other hand, if the luminance values indicated by the result of the first iteration of reading includes one or more luminance values that are lower than the predetermined value, the CPU 401 and the image synthesis processing unit 407 execute steps S13 to S15 in FIG. 4 in step S22, and outputs a read image signal in step S16. According to such a configuration, unnecessary reading of the document 100 can be prevented.

<Supplement>

Furthermore, a configuration may be adopted in which the maximum value among luminance values in the result of the first iteration of reading is determined, the second and third iterations of reading are performed with reading conditions set based on the maximum value, and the synthesis processing is performed based on the results of the second and third iterations of reading. Note that the reading conditions for the second and third iterations differ from one another, and one of the reading conditions is a condition that increases the maximum luminance value as much as possible within a range in which analog image signals are not saturated. By setting reading conditions based on the maximum value among luminance values in the result of the first iteration of reading, a read image signal that has higher color separation performance can be generated. Furthermore, a further increase in color separation performance is possible by determining a reading condition separately for each of multiple areas of the document 100 based on the result of the first iteration of reading. Specifically, a maximum luminance value and a minimum luminance value are obtained for each of the multiple areas based on the result of the first iteration of reading, and the optimal reading condition for the area is determined in accordance with the maximum and minimum values. Then, reading of an area is performed using the reading condition determined with respect to the area. Furthermore, synthesis processing is performed for each area, and a read image signal is generated based on the synthesis results of the areas. Furthermore, a configuration may be adopted such that, if there is image data of the document 100, the setting of a reading condition under which analog image signals are not saturated and the setting of areas are performed using the image data of the document 100 instead of using the result of the first iteration of reading.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-086430, filed May 25, 2023, which is hereby incorporated by reference herein in its entirety.

What is claimed is:

1. An image reading apparatus that reads a document, comprising:

a reading unit comprising:

a light source configured to emit light to the document;

a sensor configured to receive the light reflected by the document and output an analog signal based on a light reception result of the reflected light; and a converter configured to convert the analog signal output by the sensor into a digital signal, and output the digital signal obtained as a result of the conversion by the converter, and a controller configured to:

control the reading unit to perform a plurality of readings of the document; and change a reading condition of the reading unit so that a value of a first digital signal to be acquired in a first reading among the plurality of readings and a value of a second digital signal to be acquired in a second reading among the plurality of readings differ from one another, wherein the sensor includes a first light-receiving element that receives light from the document through a red filter, a second light-receiving element that receives light from the document through a green filter, and a third light-receiving element that receives light from the document through a blue filter, the analog signal is output from each of the first, second, and third light-receiving elements, and the controller does not perform the second reading if the first digital signal corresponding to the first light-receiving element, the first digital signal corresponding to the second light-receiving element, and the first digital signal corresponding to the third light-receiving element are all higher than or equal to a predetermined value.

2. The image reading apparatus according to claim 1, wherein the reading condition is a light emission intensity of the light source.

3. The image reading apparatus according to claim 1, wherein the reading condition is an accumulation time of the reflected light by the sensor.

4. The image reading apparatus according to claim 1, wherein the reading condition is a gain of the sensor.

5. The image reading apparatus according to claim 1, wherein the reading condition includes a first reading condition that is determined so that a signal value of the analog signal output by the sensor when the document is read by the reading unit is not saturated, and a second reading condition that is determined so that the signal value of the analog signal output by the sensor when the document is read by the reading unit is greater than the signal value of the analog signal when the reading unit reads the document based on the first reading condition.

6. The image reading apparatus according to claim 1, further comprising a reference member to be read by the reading unit, wherein the controller determines a reading condition to be used in the first reading based on an analog signal output by the sensor when the reference member is read by the reading unit.

7. The image reading apparatus according to claim 1, further comprising a reference member to be read by the reading unit, wherein the controller determines a reading condition to be used in the first reading based on a digital signal relating to a reading result of the reference member that is obtained by the conversion by the converter when the reference member is read by the reading unit.

8. The image reading apparatus according to claim 1, wherein the controller determines, based on the first digital signal, a luminance value that is higher than or equal to a threshold value and indicated by a reading result of the document, and determines, based on the second digital signal, a luminance value that is lower than the threshold value and indicated by the reading result of the document by the reading unit.

9. The image reading apparatus according to claim 8, wherein the threshold value is determined based on a reading condition used in the first reading and a reading condition used in the second reading.

10. The image reading apparatus according to claim 9, wherein the reading condition used in the second reading is a condition such that, if a color of a pixel in the document whose luminance value equals the threshold value is read, a signal value indicating the luminance value of the color of the pixel would be saturated in the first digital signal output by the sensor.

11. The image reading apparatus according to claim 1, wherein the controller determines a first reading condition to be used in the first reading of the document, and determines whether or not to perform the second reading based on the first digital signal obtained as a reading result of the document by the reading unit based on the first reading condition.

12. The image reading apparatus according to claim 1, wherein the controller determines the predetermined value based on a reading condition to be used in the first reading and a reading condition to be used in the second reading.

13. The image reading apparatus according to claim 1, wherein the controller is configured to set a first reading condition to be used in the first reading of the document, and determine a second reading condition to be used in the second reading based on a first digital signal obtained as a reading result of the document by the reading unit based on the first reading condition.

14. An image forming system comprising:

an image reading apparatus configured to read a document;

an image forming apparatus configured to output a test printed object by forming an image on a sheet based on first image data of a reference printed object; and a processing apparatus configured to generate second image data to be used for image forming by the image forming apparatus, the second image data being generated based on a first read image signal obtained as a result of the image reading apparatus reading the test printed object and a second read image signal obtained as a result of the image reading apparatus reading the reference printed object, wherein the image reading apparatus comprises:

a reading unit comprising a light source that is configured to emit light to the document, a sensor that is configured to receive the light reflected by the document and output an analog signal based on a light reception result of the reflected light, and a converter that is configured to convert the analog signal output by the sensor into a digital signal, the reading unit being configured to output the digital signal obtained as a result of the conversion by the converter; and a controller configured to:

control the reading unit to perform a plurality of readings of the document; and change a reading condition of the reading unit so that a value of a first digital signal to be acquired in a first reading among the plurality of readings and a value of a second digital signal to be acquired in a second reading among the plurality of readings differ from one another, and wherein the sensor includes a first light-receiving element that receives light from the document through a red filter, a second light-receiving element that receives light from the document through a green filter, and a third light-receiving element that receives light from the document through a blue filter, the analog signal is output from each of the first, second, and third light-receiving elements, and the controller does not perform the second reading if the first digital signal corresponding to the first light-receiving element, the first digital signal corresponding to the second light-receiving element, and the first digital signal corresponding to the third light-receiving element are all higher than or equal to a predetermined value.

15. An image forming system comprising:

an image reading apparatus configured to read a document; and an image forming apparatus configured to output a color adjustment chart by forming an image on a sheet based on image data of the color adjustment chart, wherein the image forming apparatus controls an image forming condition based on a read image signal obtained as a result of the image reading apparatus reading the color adjustment chart formed on the sheet, and the image reading apparatus comprises:

a reading unit comprising a light source that is configured to emit light to the document, a sensor that is configured to receive the light reflected by the document and output an analog signal based on a light reception result of the reflected light, and a converter that is configured to convert the analog signal output by the sensor into a digital signal, the reading unit being configured to output the digital signal obtained as a result of the conversion by the converter; and a controller configured to:

control the reading unit to perform a plurality of readings of the document; and change a reading condition of the reading unit so that a value of a first digital signal to be acquired in a first reading among the plurality of readings and a value of a second digital signal to be acquired in a second reading among the plurality of readings differ from one another, wherein the sensor includes a first light-receiving element that receives light from the document through a red filter, a second light-receiving element that receives light from the document through a green filter, and a third light-receiving element that receives light from the document through a blue filter, the analog signal is output from each of the first, second, and third light-receiving elements, and the controller does not perform the second reading if the first digital signal corresponding to the first light-receiving element, the first digital signal corresponding to the second light-receiving element, and the first digital signal corresponding to the third light-receiving element are all higher than or equal to a predetermined value.

* * * * *